United States Patent
Sakaue et al.

(10) Patent No.: US 7,633,268 B2
(45) Date of Patent: Dec. 15, 2009

(54) CHARGING APPARATUS

(75) Inventors: Masaaki Sakaue, Hikone (JP);
Toshiharu Ohashi, Maibara (JP)

(73) Assignee: Matsushita Electric Works, Ltd., Osaka (JP)

( * ) Notice: Subject to any disclaimer, the term of this patent is extended or adjusted under 35 U.S.C. 154(b) by 302 days.

(21) Appl. No.: 11/711,058

(22) Filed: Feb. 27, 2007

(65) Prior Publication Data
US 2007/0216349 A1    Sep. 20, 2007

(30) Foreign Application Priority Data
Feb. 27, 2006   (JP)   ............... 2006-051101

(51) Int. Cl.
*H01M 10/46*   (2006.01)
(52) U.S. Cl. ................................ 320/150
(58) Field of Classification Search .......... 320/107, 320/114, 116, 150, 160
See application file for complete search history.

(56) References Cited

U.S. PATENT DOCUMENTS 7,164,257 B2 *   1/2007   Johnson et al. ............. 320/134
2005/0258801 A9 *  11/2005   Johnson et al. ............. 320/110

* cited by examiner

*Primary Examiner*—Edward Tso
(74) *Attorney, Agent, or Firm*—Bacon & Thomas, PLLC

(57) ABSTRACT

A charging apparatus includes a battery pack, which includes a cell voltage detection unit outputting a signal if a detected cell voltage is not smaller than V1, and a temperature sensor detecting a temperature of the battery pack; and a charger, which includes a charging control circuit and a pack voltage detection unit detecting a voltage across two terminals of the battery pack. If the detected temperature from the temperature sensor exceeds 0° C., the charging control circuit switches to a constant voltage charging when the signal from the cell voltage detection unit is received; and if otherwise, the charging control unit switches to the constant voltage charging when receiving the signal or the detected pack voltage exceeds V2, whichever occurs first.

8 Claims, 9 Drawing Sheets

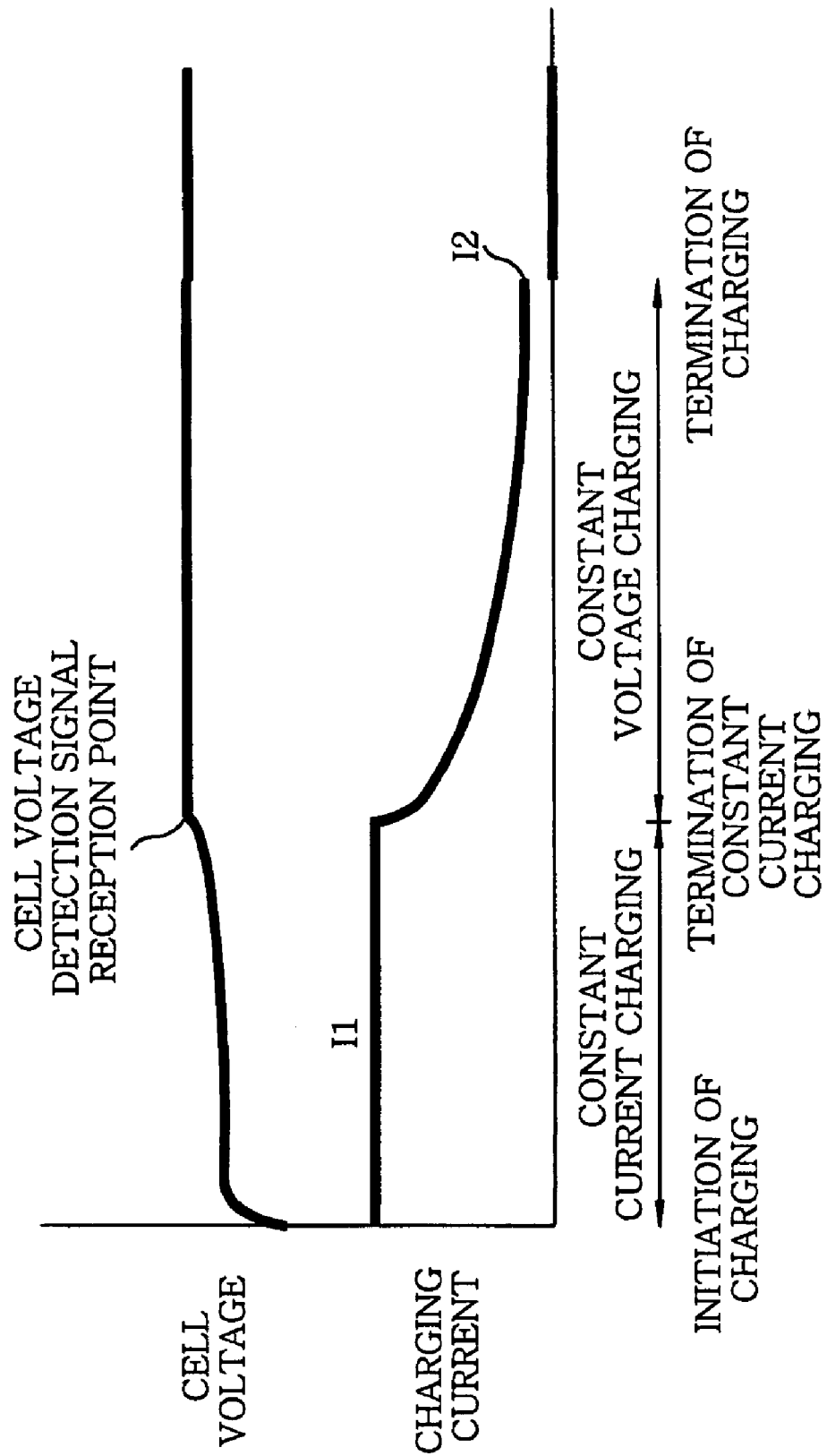

CHARGING APPARATUS

FIELD OF THE INVENTION

The present invention relates to a charging apparatus including a battery pack and a charger on which the battery pack is removably mounted.

BACKGROUND OF THE INVENTION

A conventional charging apparatus for use with a portable electric tool includes, e.g., a battery pack 1 and a charger 2 on which the battery pack 1 is removably mounted, as shown in FIG. 8. The battery pack 1 includes one or more battery cells 3, and a cell voltage detection unit 5 for detecting each of the cell voltages of the battery cells 3, and outputting a cell voltage detection signal if any one of detected cell voltages is equal to or greater than a cell voltage threshold value V1. Further, the charger 2 includes a power supply circuit 4 for charging respective battery cells 3 of the battery pack 1 and a charging control circuit 6 for controlling the power supply circuit 4.

Charging control using the charging control circuit 6, as shown in FIG. 9, is performed in such a way as to perform constant current charging at a predetermined constant current value I1 until the cell voltage detection signal is received from the cell voltage detection unit 5 and then switch to constant voltage charging upon receiving the cell voltage detection signal. The constant voltage charging continues until the charging current becomes equal to or lower than a predetermined charging completion current value I2(<I1). As for such a quick charging scheme of switching from the constant current charging to the constant voltage charging, see for example Patent Document 1.

However, such type of charging apparatus, particularly in case where a lithium-ion battery is used for the battery pack 1, is problematic in that, if the high current, high voltage quick charging control is performed as described above in a low temperature environment, in which the temperature is equal to or lower than 0° C., the capacity of the battery pack is decreased, so that the life span thereof is greatly reduced. In order to solve this problem, it may be preferable to monitor the temperature of the battery pack and change the charging control scheme at low temperatures. However, no scheme for implementing such control has been proposed yet.

[Patent Document 1] Japanese Patent Laid-Open Application No.: 2005-317283

SUMMARY OF THE INVENTION

It is, therefore, an object of the present invention to provide a charging apparatus that is capable of monitoring the internal temperature of a battery pack and automatically switching charging control so as to charge the battery pack while protecting it in a low-temperature environment.

In accordance with a first embodiment of the present invention, there is provided a charging apparatus including: a battery pack which includes a plurality of battery cells, cell voltage detection unit for detecting a cell voltage of a battery cell to output a cell voltage detection signal if a detected value is equal to or greater than a cell voltage threshold value, and a temperature sensor for detecting a temperature of the battery pack; and a charger to which the battery pack is freely removably mounted, the charger including a power supply circuit for charging the battery cells of the battery pack, pack voltage detection unit for detecting a pack voltage across two terminals of the battery pack, and a charging control circuit for controlling the power supply circuit, wherein if a detected temperature from the temperature sensor exceeds a temperature threshold value, the charging control circuit performs a first mode charging that a constant current charging is switched to a constant voltage charging when the cell voltage detection signal is received from the cell voltage detection unit, and, if the detected temperature from the temperature sensor is equal to or smaller than the temperature threshold value, the charging control circuit performs a second mode charging that the constant current charging is switched to the constant voltage charging when the cell voltage detection signal is received from the cell voltage detection unit or a detected pack voltage from the pack voltage detection unit becomes equal to or greater than a pack voltage threshold value, whichever occurs first.

The charging apparatus of the first embodiment of the first embodiment of the present invention makes it possible to monitor the internal temperature of the battery pack and automatically switch charging control so as to charge the battery pack while protecting the battery pack in a low-temperature environment.

It is preferable that the pack voltage threshold value is smaller than a value that is obtained by multiplying the cell voltage threshold value by the number of battery cells that are connected in series in the battery pack.

Further, it is also preferable that the charging control circuit performs the constant current charging of the first mode charging by using a first constant current value and the constant current charging of the second mode charging by using a second constant current value, which is smaller than the first constant current value.

In accordance with another embodiment of the present invention, there is provided a charging apparatus including: a battery pack which includes a plurality of battery cells, cell voltage detection unit for detecting a cell voltage of each battery cell to output a cell voltage detection signal if a detected value is equal to or greater than a cell voltage threshold value, and a temperature sensor for detecting temperature of the battery pack; and a charger to which the battery pack is removably mounted, the charger including a power supply circuit for charging the battery cells of the battery pack and a charging control circuit for controlling the power supply circuit such that the power supply circuit performs a constant current charging until the signal is received from the cell voltage detection unit, and then switches to a constant voltage charging after the signal has been received, wherein the charging control circuit perform a first mode charging if a detected temperature form the temperature sensor is greater than a temperature threshold value; and performs a second mode charging if the detected temperature from the temperature sensor is not greater than a temperature threshold value, the constant current charging of the second mode charging is performed by using a second constant current value that is set to be lower than a first constant current value for the constant current charging of the first mode charging.

The charging apparatus of the second embodiment of the invention also makes it possible to monitor the internal temperature of the battery pack and automatically switch charging control so as to charge the battery pack while protecting the battery pack in a low-temperature environment.

It is preferable that the charging control circuit terminates the constant voltage charging of the second mode charging when a charging current becomes equal to or smaller than a second charging completion current value that is smaller than a first charging completion current value set for the termination of the constant voltage charging of the first mode charging.

Further, it is also preferable that the charging control circuit switches to the first mode charging, if the temperature detected from the temperature sensor exceeds the temperature threshold value during the second mode charging.

The appropriate combination of the above-described elements is possible as long as it does not depart from the scope of the present invention.

In accordance with the embodiments of the present invention, the internal temperature of a battery pack is monitored and charging control is automatically switched to charge the battery pack while protecting it in a low-temperature environment.

BRIEF DESCRIPTION OF THE DRAWINGS

The above and other objects and features of the present invention will become apparent from the following description of exemplary embodiments given in conjunction with the accompanying drawings, in which:

FIG. 9 is a diagram illustrating the charging control of the charging apparatus of FIG. 8.

DETAILED DESCRIPTION OF THE EMBODIMENTS

The embodiments of the present invention will now be described with reference to the accompanying drawings.

Figure 8:
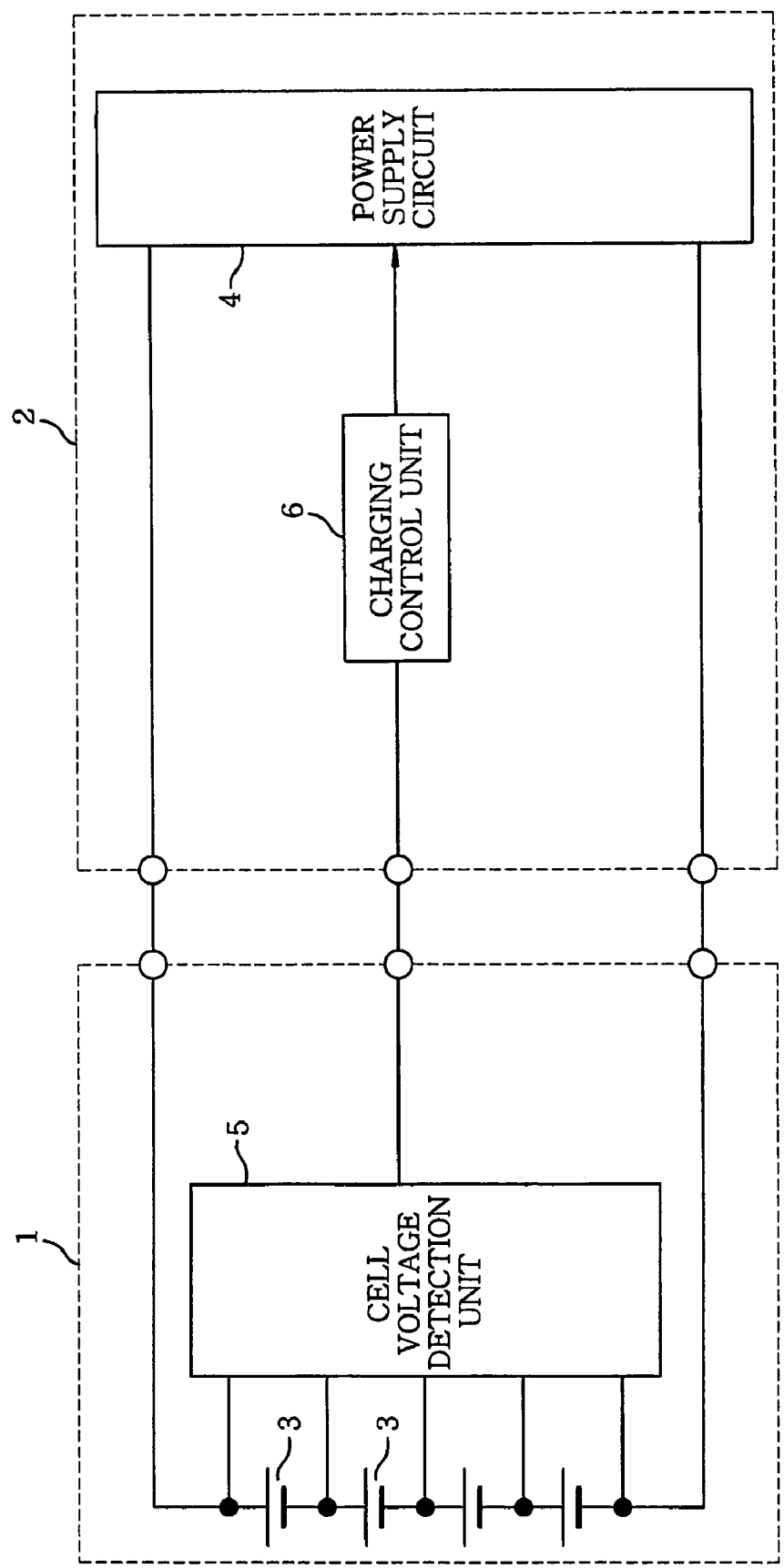
FIG. 8 is a diagram showing the schematic construction of a conventional charging apparatus.

First, a charging apparatus in accordance with a first embodiment of the present invention is described. The charging apparatus of present embodiment is identical to that of the conventional charging apparatus set forth in conjunction with FIGS. 8 and 9, excepting that changing the switching timing from constant current charging to constant voltage charging is carried out depending on the temperature of a battery. Therefore, a detailed description of the configuration that is identical to that of the prior art is omitted here, and only a description of characteristic configuration will be made below.

Figure 1:
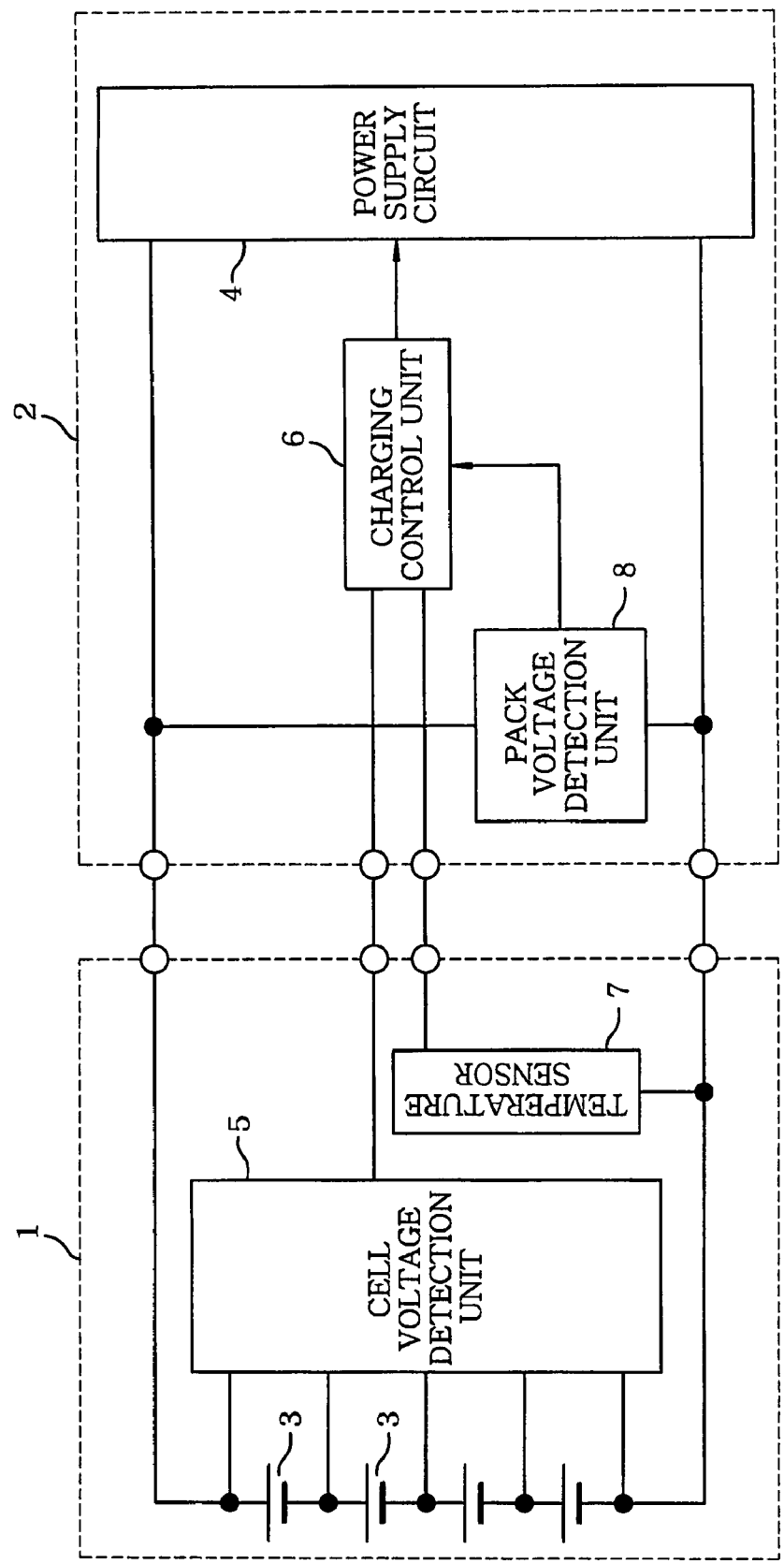
FIG. 1 is a diagram schematically showing a charging apparatus in accordance with a first embodiment of the present invention.

As shown in FIG. 1, the charging apparatus of the present embodiment includes a battery pack 1 and a charger 2 to which the battery pack 1 is removably mounted, wherein the battery pack 1 includes battery cells 3 and a cell voltage detection unit 5; and the charger 2 includes a power supply circuit 4 and a charging control circuit 6. This configuration is the same as that of the conventional charging apparatus shown in FIG. 8.

Furthermore, in the present embodiment, a temperature sensor 7 for detecting the inner temperature of the battery pack 1 is provided in the battery pack 1. The detected value from the temperature sensor 7 is inputted to the charging control circuit 6 of the charger 2. Furthermore, pack voltage detection unit 8 for detecting a pack voltage across two terminals of the battery pack 1 is provided in the charger 2. The detected value from the pack voltage detection unit 8 is also inputted to the charging control circuit 6. That is, a cell voltage detection signal from the cell voltage detection unit 5, the detected value from the temperature sensor 7, and the detected value from the pack voltage detection unit 8 are inputted to the charging control circuit 6 of the present embodiment, so that the timing of switching from the constant current charging to the constant voltage charging is determined based on the inputted data.

In more detail, if the detected temperature of the temperature sensor 7 exceeds a predetermined temperature threshold value (0° C. in the present embodiment), the charging control circuit 6 performs the same charging control as that of the prior art. That is, in such a case the power supply circuit 4 is controlled such that the constant current charging is performed until the cell voltage detection signal is received from the cell voltage detection unit 5, switching to the constant voltage charging is performed after the signal has been received, and charging is terminated when the charging current becomes equal to or lower than the charging completion current value I2, as shown in FIG. 9.

Figure 2:
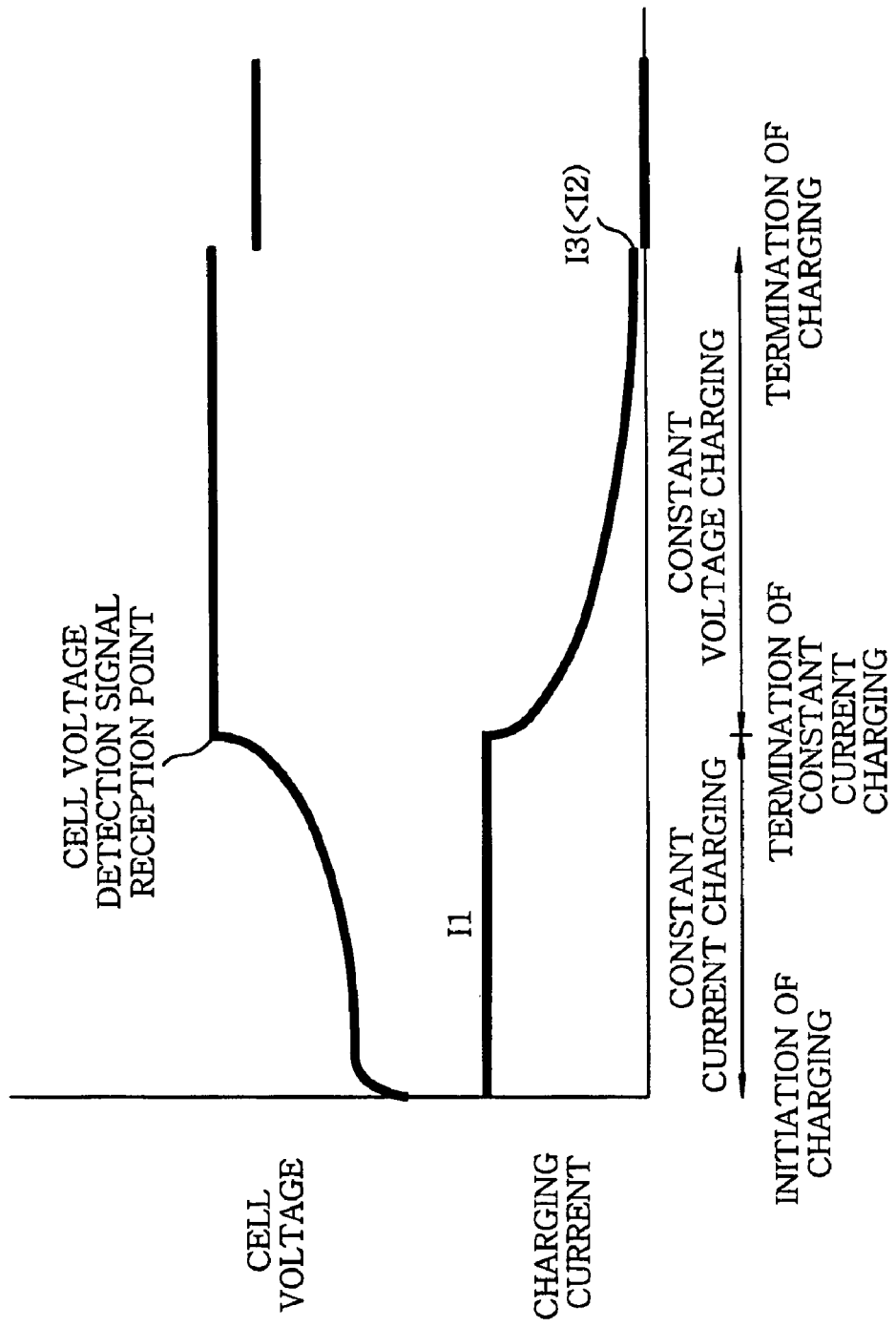
FIG. 2 is a diagram illustrating a charging control scheme of the charging apparatus of FIG. 1 in a low-temperature environment.
Figure 3:
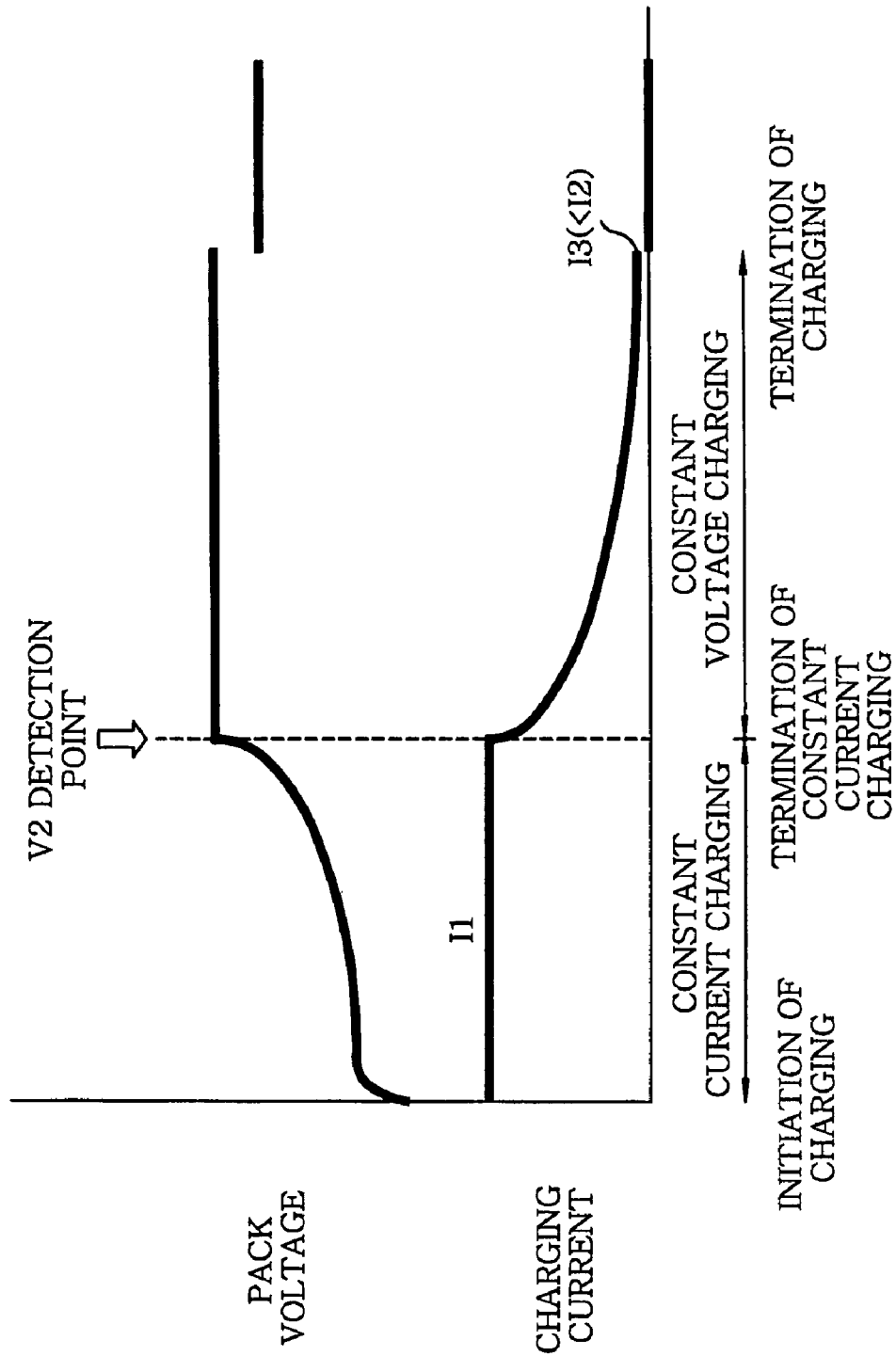
FIG. 3 is a diagram illustrating another exemplary charging control scheme of the charging apparatus of FIG. 1 in a low-temperature environment.

On the other hand, if the detected temperature of the temperature sensor 7 is equal to or lower than the temperature threshold value, the switching from constant current charging to constant voltage charging is performed at an earlier timing between a timing at which the signal is received from the cell voltage detection unit 5 (that is, when the cell voltage of any one of the battery cells 3 reaches a value that is equal to or larger than the predetermined cell voltage threshold value V1) and the timing at which the detected value from the pack voltage detection unit 8 reaches a value that is equal to or higher than the pack voltage threshold value V2 (that is, the voltage of the two terminals of the entire battery pack 1 formed of a plurality of battery cells 3 connected in series becomes equal to or higher than the predetermined pack voltage threshold value V2). FIG. 2 schematically shows the case where the switching is performed at the former timing, and FIG. 3 schematically shows the case where the switching is performed at the latter timing. After switching to the constant voltage charging, charging is terminated when the charging current becomes equal to or less than a predetermined charging completion current value I3. In this case, the charging completion current value I3 is set to be lower than the charging completion current value I2, which is set in the case where the detected value from the temperature sensor 7 exceeds the temperature threshold value.

Assuming that the number of battery cells 3, which are connected in series in the battery pack 1, is k, the pack voltage threshold value V2 is set within the range of V2<V1×k. As a result, when the battery pack 1 is in a low-temperature environment, equal to or lower than 0° C., the battery pack 1 can be protected by suppressing high voltage. Furthermore, although the amount of charging is intended to be assured by using the charging completion current value I3<I2, the charging completion current value I2 may be used in lieu of I3, regardless of the temperature of the battery.

Next, a charging apparatus in accordance with a second embodiment of the present invention will be described. The charging apparatus of the present embodiment is identical to that of the conventional charging apparatus set forth with reference to FIGS. 8 and 9, excepting that the charging current value is varied depending on the temperature of a battery during the constant current charging. Therefore, a detailed description of the construction that is identical to that of the prior art is omitted, and only a description of characteristic configuration will be made below.

Figure 4:
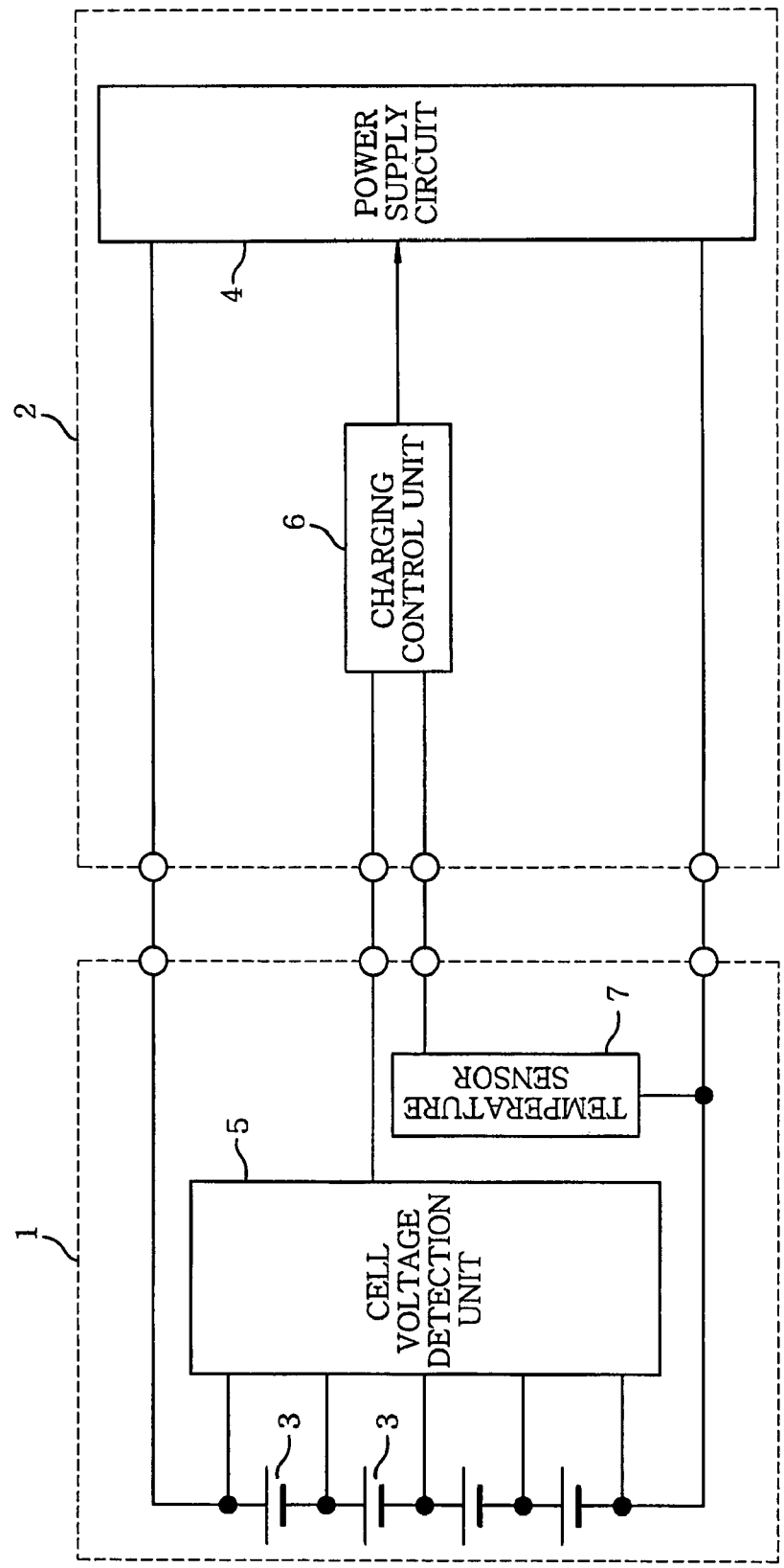
FIG. 4 is a diagram schematically showing a charging apparatus in accordance with a second embodiment of the present invention.

As shown in FIG. 4, the charging apparatus of the present embodiment includes a battery pack 1 and a charger 2, to which the battery pack 1 is removably mounted, wherein the battery pack 1 includes a plurality of battery cells 3 and a cell voltage detection unit 5, and the charger 2 includes a power supply circuit 4 and a charging control circuit 6. This configuration is the same as that of the conventional charging apparatus shown in FIG. 8.

Furthermore, in the present embodiment, a temperature sensor 7 for detecting the inner temperature of the battery pack 1 is provided in the battery pack 1. The detected value from the temperature sensor 7 is inputted to the charging control circuit 6 of the charger 2. That is, a signal from the cell voltage detection unit 5 and a detected value from the temperature sensor 7 are inputted to the charging control circuit 6 of the present embodiment.

In the present embodiment, when the temperature detected by the temperature sensor 7 exceeds the temperature threshold value 0° C. in this embodiment, the charging control circuit 6 performs the same charging control as in the prior art. That is, in this case, the power supply circuit 4 is controlled such that the constant current charging is performed at a constant current value I1 until the cell voltage detection signal is received from the cell voltage detection unit 5, switching to the constant voltage charging is performed after the signal has been received, and the charging is terminated when the charging current becomes equal to or lower than the charging completion current value I2, as shown in FIG. 9.

Figure 5:
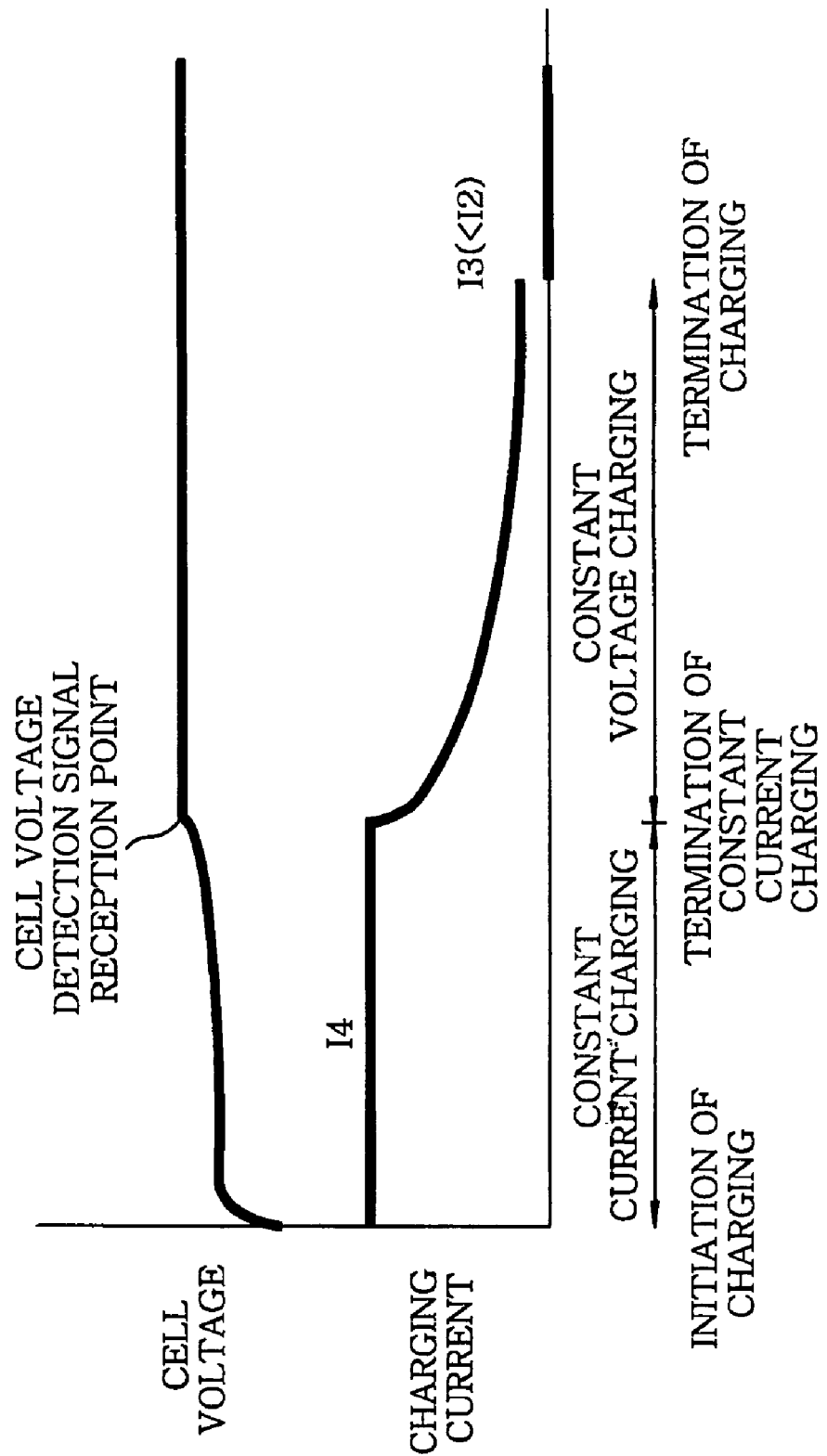
FIG. 5 is a diagram illustrating a charging control scheme of the charging apparatus of FIG. 4 in a low-temperature environment.

Meanwhile, when the temperature detected by the temperature sensor 7 becomes equal to or lower than the temperature threshold value, the power supply circuit 4 is controlled such that the constant current charging is performed with a constant current value I4 until the cell voltage detection signal is received from the cell voltage detection unit 5, switching to the constant voltage charging is performed after the signal has been received, and the charging is terminated when the charging current becomes equal to or lower than the predetermined charging completion current value I3, as schematically shown in FIG. 5.

Here, the constant current value I4 is set to be lower than a constant current value I1 that is set in the case where the detected value of the temperature sensor 7 is higher than the temperature threshold value. Accordingly, the battery pack 1 can be protected by suppressing a high current in a low temperature environment equal to or lower than 0° C. Furthermore, in this case, the charging completion current value I3 is set to be lower than the charging completion current value I2 that is set when the detected value from the temperature sensor 7 exceeds the temperature threshold value, thus attempting to ensure a sufficient amount of charging. However, if the charging completion current value I2 may be employed instead of I3 regardless of the temperature of the battery.

Figure 6:
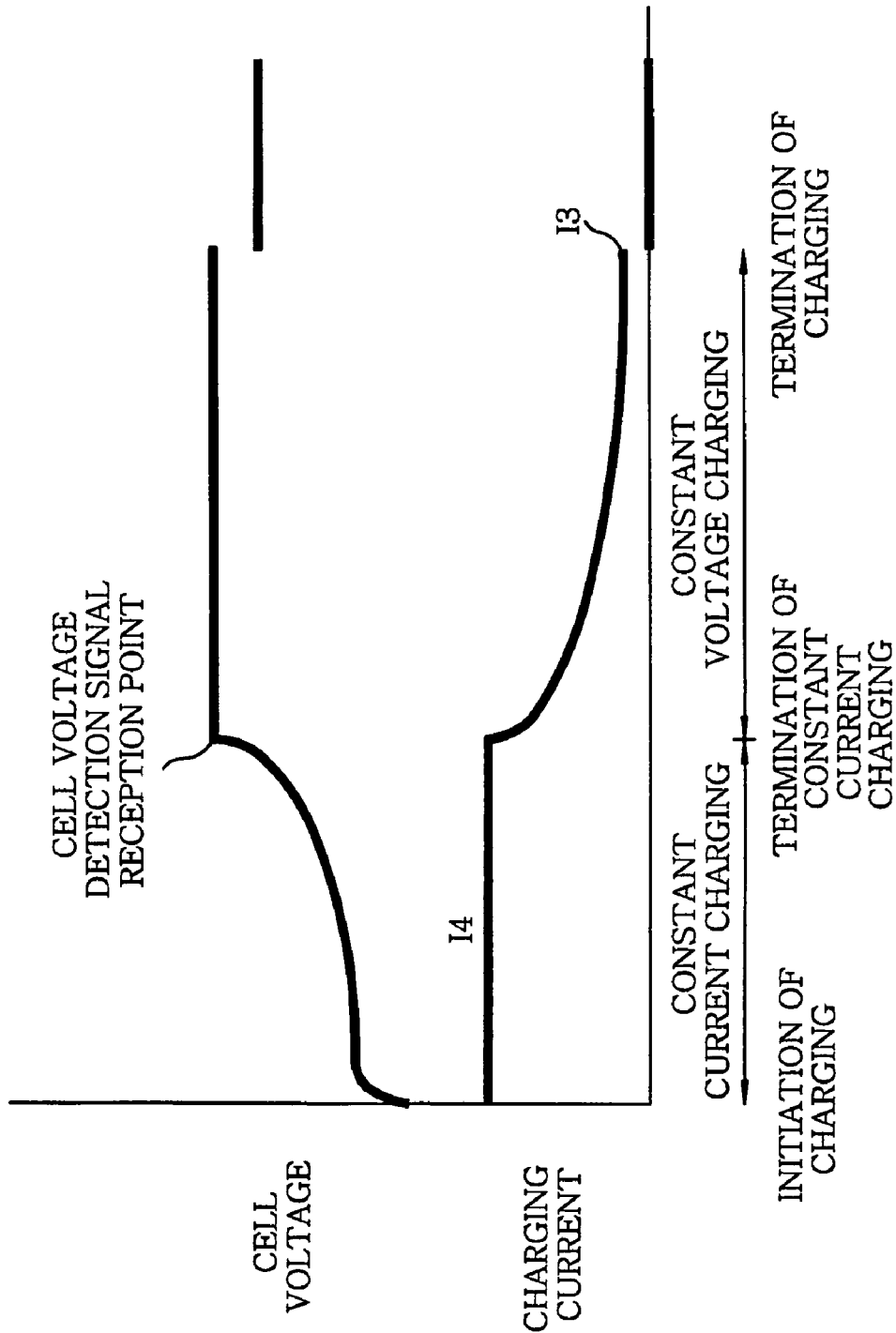
FIG. 6 is a diagram illustrating a charging control scheme of a charging apparatus in a low temperature environment, in which the first and the second embodiment of the present invention are combined.
Figure 7:
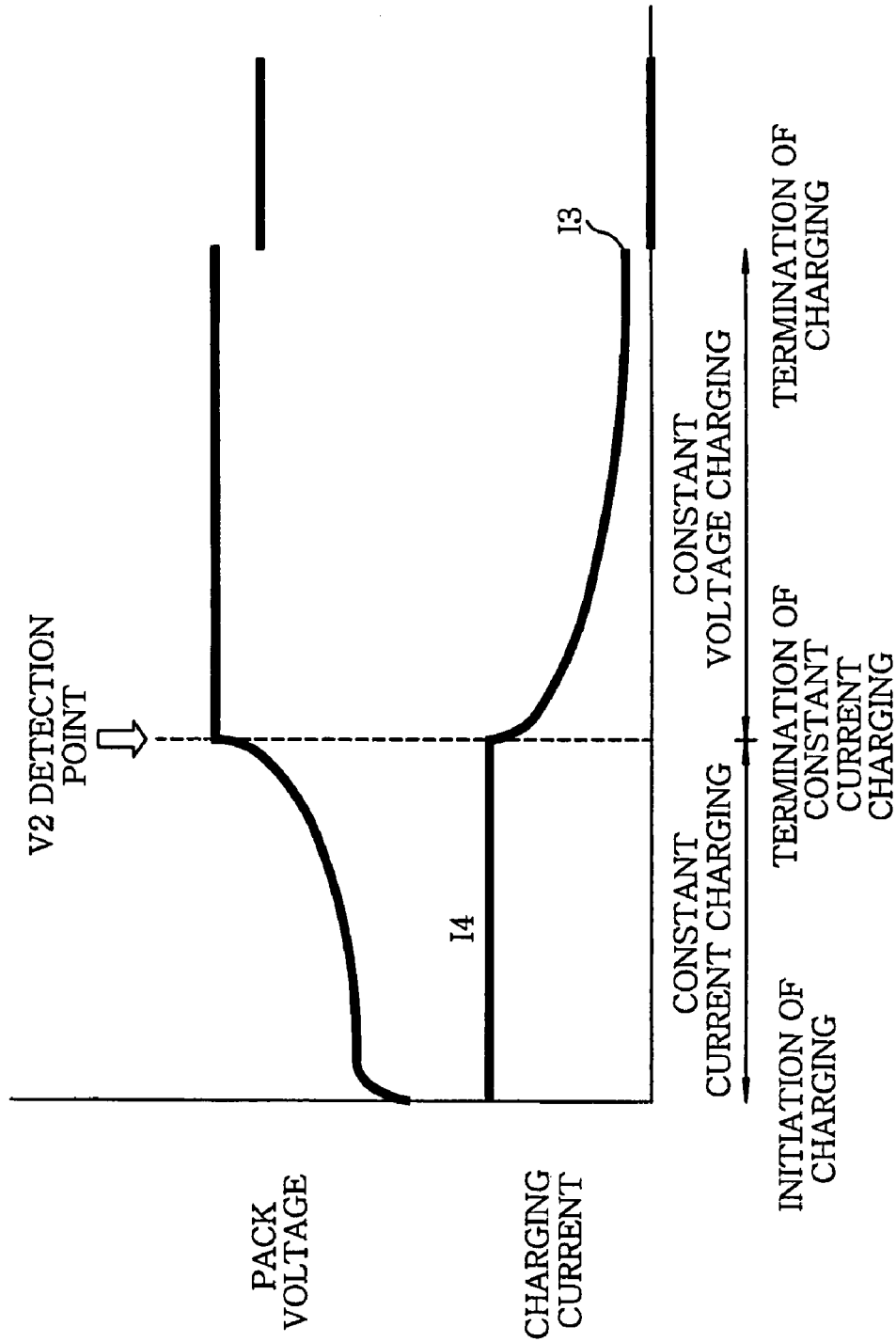
FIG. 7 is a diagram illustrating another exemplary charging control scheme of the charging apparatus in a low temperature environment in which the first and the second embodiment of the present invention are combined.

Furthermore, as schematically shown in FIG. 6 or 7, it may preferable to construct a charging apparatus by combining the characteristic configuration of the first embodiment with the characteristic configuration of the second embodiment. In this case, the charging apparatus includes the temperature sensor 7 and the pack voltage detection unit 8 that is same as the first embodiment. Furthermore, when the temperature detected by the temperature sensor 7 exceeds the temperature threshold value, the constant current charging is performed with the constant current value I1 until the cell voltage detection signal is received from the cell voltage detection unit 5, switching to the constant voltage charging is performed after the signal has been received, and then the charging is terminated when charging current becomes equal to or lower than the charging completion current value I2, as shown in FIG. 9.

Meanwhile, when the temperature detected by the temperature sensor 7 becomes equal to or lower than the temperature threshold value, the constant current charging is performed with the constant current value I4 until the cell voltage detection signal has been received from the cell voltage detection unit 5 or until the detected value from the pack voltage detection unit 8 becomes equal to or higher than the pack voltage threshold value V2, switching to the constant voltage charging is performed after receiving the signal, and then the charging is terminated when the charging current becomes equal to or lower than the charging completion current value I3, as schematically shown in FIG. 6 or 7. FIG. 6 schematically shows the case where the switching is performed when the cell voltage detection signal is received from the cell voltage detection unit 5, and FIG. 7 schematically shows the case where the switching is performed when the detected value from the pack voltage detection unit 8 becomes equal to or higher than the pack voltage threshold value V2.

In any one of the above-described embodiments, it is preferable that the charging control circuit 6 is configured such that the charging mode is switched form a second mode charging to a first mode charging if the detected value form the temperature sensor 7 exceeds the temperature threshold value while performing the second mode charging, wherein the first mode charging is the one carried out when the detected temperature exceeds the temperature threshold value (e.g., as shown in FIG. 9), whereas the second mode charging is the one carried out when the detected temperature is not greater than the temperature threshold value (e.g., as shown in FIGS. 2 and 3 for the first embodiment).

What is claimed is:

1. A charging apparatus comprising:
a battery pack which includes a plurality of battery cells, cell voltage detection unit for detecting a cell voltage of a battery cell to output a cell voltage detection signal if a detected value is equal to or greater than a cell voltage threshold value, and a temperature sensor for detecting a temperature of the battery pack; and
a charger to which the battery pack is freely removably mounted, the charger including a power supply circuit for charging the battery cells of the battery pack, pack voltage detection unit for detecting a pack voltage across two terminals of the battery pack, and a charging control circuit for controlling the power supply circuit, wherein if a detected temperature from the temperature sensor exceeds a temperature threshold value, the charging control circuit performs a first mode charging that a constant current charging is switched to a constant voltage charging when the cell voltage detection signal is received from the cell voltage detection unit, and, if the detected temperature from the temperature sensor is equal to or smaller than the temperature threshold value, the charging control circuit performs a second mode charging that the constant current charging is switched to the constant voltage charging when the cell voltage detection signal is received from the cell voltage detection unit or a detected pack voltage from the pack voltage detection unit becomes equal to or greater than a pack voltage threshold value, whichever occurs first.

2. The charging apparatus of claim 1, wherein the pack voltage threshold value is smaller than a value that is obtained by multiplying the cell voltage threshold value by the number of battery cells that are connected in series in the battery pack.

3. The charging apparatus of claim 1, wherein the charging control circuit performs the constant current charging of the first mode charging by using a first constant current value and the constant current charging of the second mode charging by using a second constant current value, which is smaller than the first constant current value.

4. The charging apparatus of claim 2, wherein the charging control circuit performs the constant current charging of the first mode charging by using a first constant current value and the constant current charging of the second mode charging by using a second constant current value, which is smaller than the first constant current value.

5. A charging apparatus comprising:
 a battery pack which includes a plurality of battery cells, cell voltage detection unit for detecting a cell voltage of each battery cell to output a cell voltage detection signal if a detected value is equal to or greater than a cell voltage threshold value, and a temperature sensor for detecting temperature of the battery pack; and
 a charger to which the battery pack is removably mounted, the charger including a power supply circuit for charging the battery cells of the battery pack and a charging control circuit for controlling the power supply circuit such that the power supply circuit performs a constant current charging until the signal is received from the cell voltage detection unit, and then switches to a constant voltage charging after the signal has been received, wherein the charging control circuit perform a first mode charging if a detected temperature form the temperature sensor is greater than a temperature threshold value; and performs a second mode charging if the detected temperature from the temperature sensor is not greater than a temperature threshold value, the constant current charging of the second mode charging is performed by using a second constant current value that is set to be lower than a first constant current value for the constant current charging of the first mode charging.

6. The charging apparatus of any one of claims 1 to 5, wherein the charging control circuit terminates the constant voltage charging of the second mode charging when a charging current becomes equal to or smaller than a second charging completion current value that is smaller than a first charging completion current value set for the termination of the constant voltage charging of the first mode charging.

7. The charging apparatus of any one of claims 1 to 5, wherein the charging control circuit switches to the first mode charging, if the temperature detected from the temperature sensor exceeds the temperature threshold value during the second mode charging.

8. The charging apparatus of claim 6, wherein the charging control circuit switches to the first mode charging, if the temperature detected from the temperature sensor exceeds the temperature threshold value during the second mode charging.

* * * * *